US012726070B2

(12) United States Patent
Claywell et al.

(10) Patent No.: US 12,726,070 B2
(45) Date of Patent: Sep. 1, 2026

(54) WEDGE FOR AN ELECTRIC MOTOR

(71) Applicant: GM Global Technology Operations LLC, Detroit, MI (US)

(72) Inventors: Mark R. Claywell, Birmingham, MI (US); Brad J. Heckman, Oxford, MI (US); Eric F. Grimminger, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 18/942,143

(22) Filed: Nov. 8, 2024

(65) Prior Publication Data

US 2026/0135428 A1 May 14, 2026

(51) Int. Cl.
*H02K 3/487* (2006.01)
*H02K 19/02* (2006.01)

(52) U.S. Cl.
CPC ............. *H02K 3/487* (2013.01); *H02K 19/02* (2013.01)

(58) Field of Classification Search
CPC ...................................................... H02K 3/487
USPC .......................................................... 310/162
See application file for complete search history.

(56) References Cited

U.S. PATENT DOCUMENTS 9,601,961 B2 3/2017 Lee et al.
2020/0177046 A1 * 6/2020 Finger-Albert .......... H02K 7/04

FOREIGN PATENT DOCUMENTS

| | | | |
|---|---|---|---|
| DE | 102015214158 | A1 | 6/2016 |
| DE | 102016219739 | A1 | 4/2018 |
| DE | 102017002420 | A1 | 9/2018 |
| DE | 102021113309 | A1 | 11/2022 |
| EP | 2993763 | A2 | 3/2016 |
| KR | 101513640 | B1 | 4/2015 |

* cited by examiner

*Primary Examiner* — Terrance L Kenerly
*Assistant Examiner* — Theodore L Perkins
(74) *Attorney, Agent, or Firm* — Vivacqua Crane, PLLC

(57) ABSTRACT

A rotor includes a laminate core that defines poles and pole shoes. The pole shoes define slots for receiving wire coils. An outer wedge is disposed in the slots. The outer wedge includes a top portion disposed at an outer diameter of the rotor. The top portion includes an upper surface and a lower surface. The upper surface and the lower surface create a continuous curve that compresses against the pole shoes. The upper surface creates a first seal and the lower surface creates a second seal. The outer wedge also includes a bottom portion which continuously connects to the top portion and is in contact with the coil wires. The bottom portion includes a winding support surface and a wedge tip surface. The winding support surface connects to the lower surface of the top portion. The wedge tip surface extends towards the laminate core along the wedge central axis.

20 Claims, 6 Drawing Sheets

WEDGE FOR AN ELECTRIC MOTOR

INTRODUCTION

The present disclosure relates to a wedge for an electric motor. More particularly, the present disclosure relates to a wedge for a separately excited rotor in an electric motor to compress wire coils and to seal to the rotor in order to retain cooling fluid therein.

A separately excited synchronous motor (SESM) generally includes a stator and a rotor. Instead of permanent magnets in the rotor, the SESM includes wire coils which generate a rotor field. The magnetic field of the rotor can therefore be adjusted by a level of electric current applied to the wire coils.

The rotor includes a laminate core having poles and pole shoes that define slots. The wire coils are disposed within the slots and are wound around the poles. With the application of an electrical current to the wire coils, the rotor begins to rotate at a high speed. While rotating, the wire coils experience strain through radial forces and may become misaligned.

One solution is to insert a wedge into the slots. The wedge compresses against the wire coils, protecting the wire coils and maintaining alignment. While effective, there is a need in the art for an improved wedge design having a stronger seal between the wedge and the pole shoes and that allows additional wire coils to be placed within the slots while maintaining the compression against the wire coils during high rotational speeds.

SUMMARY

According to several aspects, a wedge for a rotor is provided. The rotor includes a laminate core that defines a rotational axis, poles, and pole shoes, wherein the rotor defines slots for receiving wire coils. The wedge includes an outer wedge that defines a wedge central axis perpendicular to the rotational axis. The outer wedge is disposed in the slots. The outer wedge includes a top portion disposed at an outer diameter of the rotor. The top portion includes an upper surface that slopes away from the wedge central axis while moving radially outward and perpendicular from a rotor axis. The upper surface compresses against the pole shoe to create a seal. The outer wedge also includes a lower surface that slopes towards the wedge central axis while moving radially outward and perpendicular from the rotor axis. The lower surface seals to the pole shoes when a radial load is present. The upper surface and the lower surface create a continuous curve. The outer wedge also includes a bottom portion continuously connected to the top portion. The bottom portion includes a winding support surface which is connected to the lower surface of the top portion. The bottom portion also includes a wedge tip surface. The wedge tip surface extends towards the laminate core along the wedge central axis. The winding support surface and the wedge tip surface are adjacent to the wire coils.

In an additional aspect of the present disclosure, the outer wedge includes a convex portion disposed between the lower surface of the top portion and the winding support surface of the bottom portion.

In another aspect of the present disclosure, varnish manifolds are defined by the convex portion and the pole shoes. The varnish manifolds enable a varnish to cover the wire coils and seal spaces between laminates that form the laminate core.

In another aspect of the present disclosure, the outer wedge includes a flexible hinge located where the lower surface of the top portion and the bottom portion of the outer wedge connect. The flexible hinge allows the top portion to move independently relative to the bottom portion.

In another aspect of the present disclosure, the winding support surface forms a slant away from the wedge central axis while moving radially outward and perpendicular from the rotor axis.

In another aspect of the present disclosure, the wedge also includes an inner wedge. The inner wedge is disposed within a groove of the outer wedge. The inner wedge matches the contour of the inner surface of the outer wedge and creates compression against the pole shoes and the winding support surface.

In another aspect of the present disclosure, the inner wedge defines a shaped hole along an axial length. The shaped hole increases an absorption of the radial load. The shaped hole also allows a tunable compression stiffness from the poles to adjacent poles.

In another aspect of the present disclosure, the inner wedge includes pockets. The pockets each vary in size to adjust stiffness along the axial length of the wedge.

In another aspect of the present disclosure, the pockets are on an upper surface of the inner wedge. The upper surface of the inner wedge is disposed at the outer diameter of the rotor.

In another aspect of the present disclosure, the pockets are on sides of the inner wedge. The sides of the inner wedge are in contact with the inner surface of the outer wedge.

According to several aspects, a wedge for a rotor is provided. The rotor includes a laminate core that defines a rotational axis, poles, and pole shoes, wherein the rotor defines slots for receiving wire coils. The wedge includes an outer wedge that defines a wedge central axis perpendicular to the rotational axis. The outer wedge is disposed in the slots. The outer wedge includes a top portion disposed at an outer diameter of the rotor. The top portion includes an upper surface that slopes away from the wedge central axis while moving radially outward and perpendicular from a rotor axis. The upper surface compresses against the pole shoes to create a seal. The top portion also includes a lower surface that slopes towards the wedge central axis while moving radially outward and perpendicular from the rotor axis. The lower surface seals to the pole when a radial load is present. The upper surface and the lower surface create a continuous curve. The outer wedge also includes a bottom portion. The bottom portion continuously connects to the top portion. The bottom portion includes a winding support surface which connects to the lower surface of the top portion. The bottom portion also includes a wedge tip surface. The wedge tip surface extends towards the laminate core along the wedge central axis. The winding support surface and the wedge tip surface are adjacent to the wire coils. The wedge also includes an inner wedge. The inner wedge is disposed within a groove of the outer wedge. The inner wedge creates compression in the pole shoe and the winding support surface.

In another aspect of the present disclosure, a varnish manifold is provided. The varnish manifolds are defined by the pole shoes and where the lower surface of the top portion and the bottom portion of the outer wedge connect. The varnish manifolds enable a varnish to cover the wire coils and seal spaces between laminates that form the laminate core.

In another aspect of the present disclosure, the outer wedge includes a flexible hinge where the lower surface of the top portion and the bottom portion of the outer wedge connect. The flexible hinge allows the top portion to move independently relative to the bottom portion.

In another aspect of the present disclosure, the winding support surface forms a slant away from the wedge central axis while moving radially outward and perpendicular from the rotor axis.

In another aspect of the present disclosure, the inner wedge defines a shaped hole along an axial length of the wedge. The shaped hole increases an absorption of the radial load. The shaped hole also allows a tunable compression stiffness from the poles to adjacent poles.

In another aspect of the present disclosure, the inner wedge matches the contour of the inner surface of the outer wedge.

In another aspect of the present disclosure, the inner wedge includes pockets. The pockets each vary in size to adjust stiffness along the axial length of the wedge.

In another aspect of the present disclosure, the pockets are on an upper surface of the inner wedge. The upper surface of the inner wedge is disposed at the outer diameter of the rotor.

In another aspect of the present disclosure, the pockets are on sides of the inner wedge, wherein the sides of the inner wedge are in contact with the inner surface of the outer wedge.

According to several aspects, a rotor for a separately excited synchronous motor is provided. The rotor includes a laminate core, a copper winding, and a wedge. The laminate core includes poles and pole shoes that define slots. The copper winding wraps around the plurality of poles. The wedge includes an outer wedge. The outer wedge defines a wedge central axis perpendicular to the rotational axis. The outer wedge is disposed in the slots. The outer wedge includes a top portion disposed at an outer diameter of the rotor. The top portion includes an upper surface. The upper surface compresses against the pole shoes to create a first seal. The top portion also includes a lower surface. The lower surface compresses against the pole shoes to create a second seal. The outer wedge also includes a bottom portion. The bottom portion continuously connects to the top portion. The bottom portion includes a winding support surface connected to the lower surface of the top portion. The bottom portion also includes a wedge tip surface. The wedge tip surface extends towards the laminate core along the wedge central axis. The wedge also includes an inner wedge. The inner wedge is disposed within a groove of the outer wedge. The inner wedge creates compression against the pole shoes and the winding support surface.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
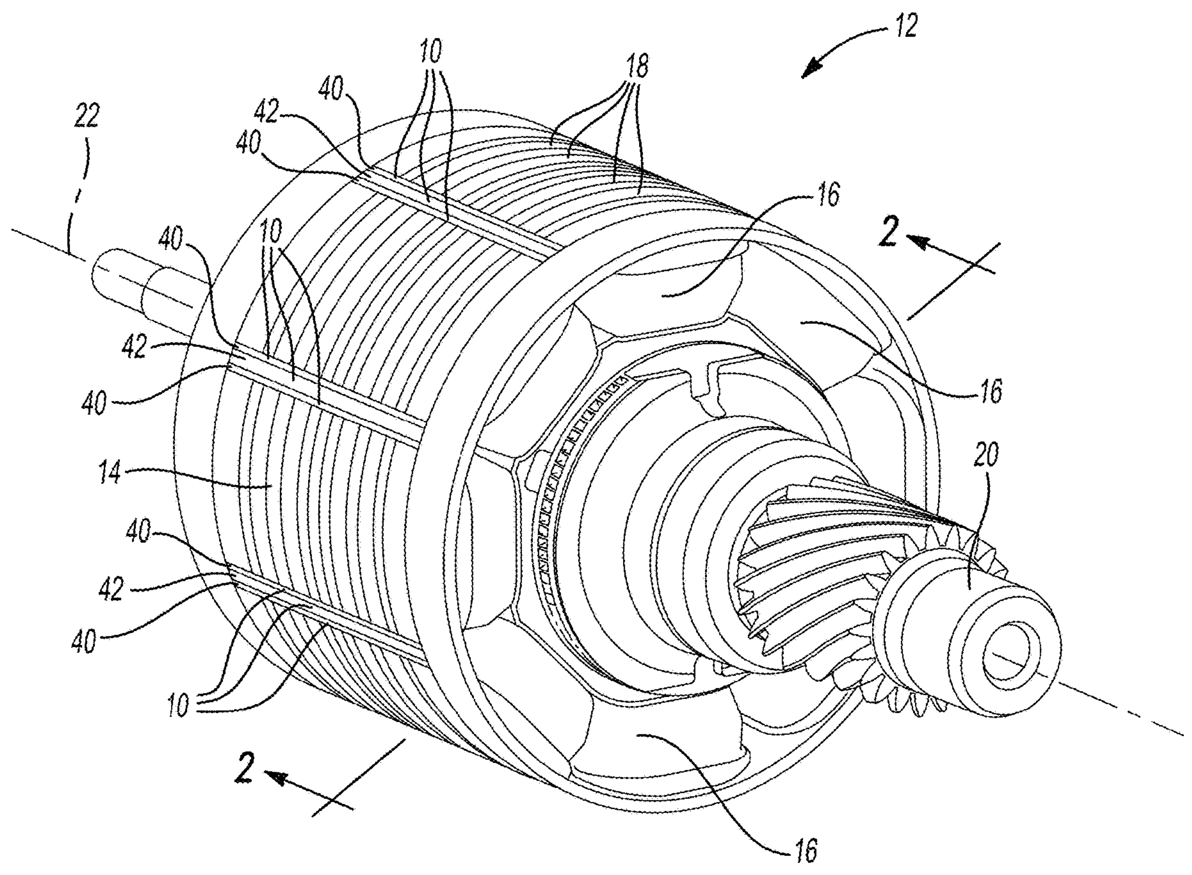
FIG. 1 is an isometric view of a rotor of a SESM having a wedge according to the principles of the present disclosure.
Figure 2:
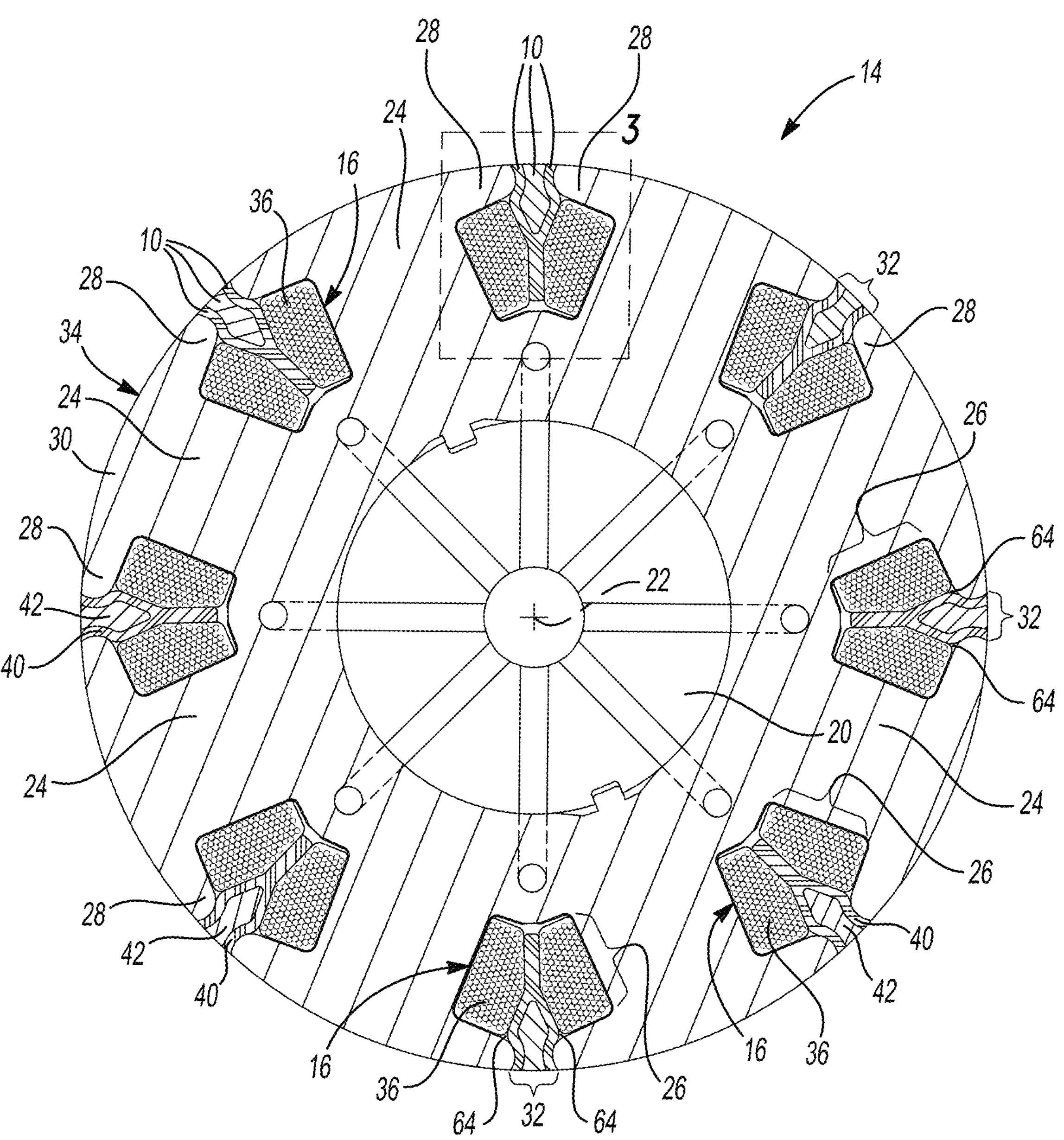
FIG. 2 is a cross-section view of the rotor viewed in the direction of arrows 2-2 in FIG. 1.

Referring to FIGS. 1 and 2, a plurality of wedges 10 according to the principles of the present disclosure are shown with an exemplary rotor 12. The rotor 12 is part of a separately excited synchronous motor (SESM) (not shown). The SESM converts electrical energy into mechanical energy when a current is applied to the rotor 12. The rotor 12 includes a laminate core 14 and a copper winding 16.

The laminate core 14 supports the copper winding 16 and is comprised of a number of laminates 18. The laminates 18 are stacked together to form the laminate core 14. The laminate core 14 is connected to an output shaft 20 of the rotor 12. The output shaft 20 defines a rotational axis 22 of the rotor 12 about which the rotor 12 rotates.

As best seen in FIG. 2, the laminate core 14 includes a plurality of poles 24 that extend radially away from the rotational axis 22. Each of the poles 24 has a curved outer portion 34. Adjacent poles 24 define slots 26 within the laminate core 14. Each of the poles 24 further include pole shoes 28. The pole shoes 28 are disposed at radial distal ends 30 of the poles 24 and extend circumferentially away from the poles 24. Adjacent pole shoes 28 define gaps 32 in the curved outer portion 34 of the laminate core 14. The gaps 32 communicate with the slots 26 and are sized to receive the wedges 10, as will be described in greater detail below.

The copper winding 16 is a wire wound about the laminate core 14. Portions of the copper winding 16 are wrapped around each of the poles 24 to form wire coils 36. The wire coils 36 are disposed within the slots 26. When a current is applied to the copper winding 16, the rotor 12 begins to rotate at a high speed.

Figure 3:
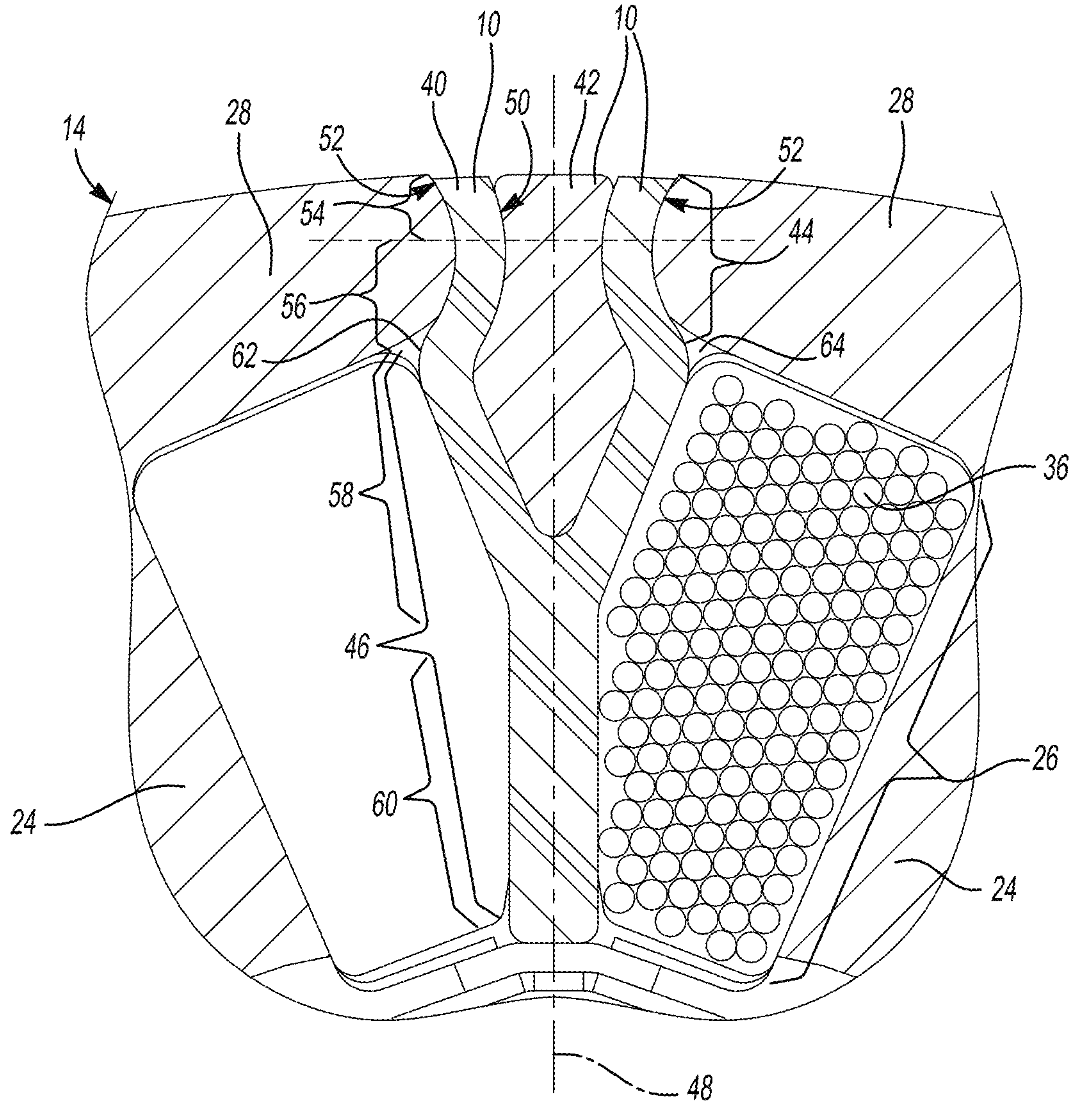
FIG. 3 is an enlarged cross-section view of the wedge.

Referring now to FIG. 3, an enlarged view of one of the plurality of wedges 10 is illustrated. It should be appreciated that each of the wedges 10 is identical, and therefore only one of the wedges 10 will be described herein. For the purpose of clarity, the wire coils 36 on the left side of the slot 26 are not shown. The wedges 10 are used to compress adjacent wire coils 36 and to create a seal to the laminate core 14. The wedges 10 include an outer wedge 40 and an inner wedge 42 disposed within the outer wedge 40.

The outer wedge 40 includes a top portion 44 and a bottom portion 46. The top portion 44 is disposed radially outwards from the bottom portion 46. The top portion 44 and the bottom portion 46 define a wedge central axis 48 that extends from the bottom portion 46 to the top portion 44 along a center line of the wedges 10. The wedge central axis 48 extends perpendicular to the rotational axis 22 of the rotor 12 (shown in FIGS. 1-2) and the output shaft 20 (shown in FIGS. 1-2).

The outer wedge 40 includes an inner surface 50 and an outer surface 52. The inner surface 50 defines a groove for receiving the inner wedge 42. The groove extends along an axial length of the outer wedge 40. The outer surface 52 of the top portion 44 includes a number of features configured to seal to the pole shoes 28 under various conditions. The top portion 44 includes an upper surface 54 and a lower surface 56.

The upper surface 54 slopes away from the wedge central axis 48 while moving towards the outer diameter of the rotor 12. The upper surface 54 compresses against the pole shoes 28, creating a first seal. The first seal is maintained while the rotor 12 is stationary and the first seal decreases under increasing rotational speed.

The lower surface 56 slopes towards the wedge central axis 48 while moving towards the outer diameter of the rotor 12. The lower surface 56 compresses against the pole shoes 28, creating a second seal. The second seal is maintained while stationary and is also maintained under the presence of a radial force when the rotor 12 is rotating.

The bottom portion 46 compresses against the wire coils 36, maintaining the alignment of the wire coils 36 within the slots 26. The bottom portion 46 includes a winding support surface 58 and a wedge tip surface 60. The winding support surface 58 connects to the lower surface 56 and forms a slant away from the wedge central axis 48 while moving towards the outer diameter of the rotor 12. The wedge tip surface 60 extends towards the output shaft 20 (shown in FIGS. 1-2).

The top portion 44 and the bottom portion 46 are continuously connected together by a convex portion 62. The convex portion 62 connects the lower surface 56 of the top portion 44 with the winding support surface 58 of the bottom portion 46.

Figure 4A:
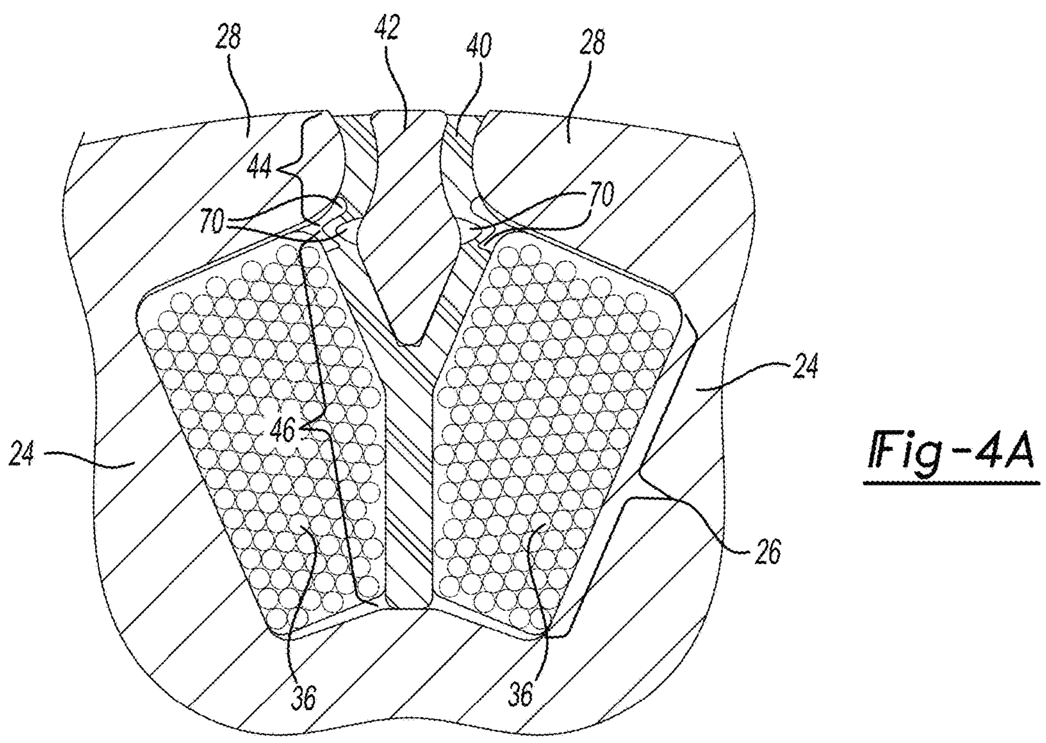
FIG. 4A is an enlarged cross-section view of an alternate embodiment of the wedge having a flexible hinge.

In an alternate embodiment, the top portion 44 and the bottom portion 46 are continuously connected together by a flexible hinge 70, shown in FIG. 4A. The flexible hinge 70 includes a flexible area which allows independent compression between the pole shoes 28 and wire coils 36. The flexible hinge 70 is in contact with the wire coils 36 and allows the winding support surface 58 to have more compression against the wire coils 36. The wire coils 36 have a looser tolerance and a low stiffness.

Figure 4B:
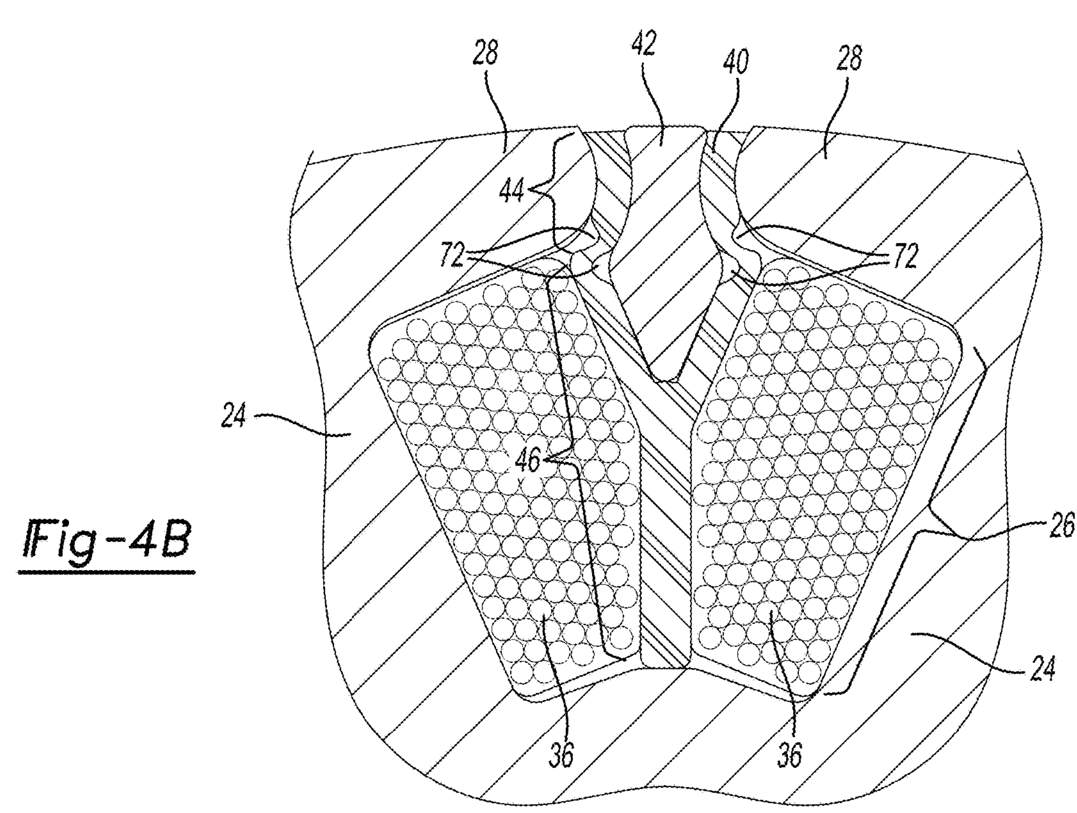
FIG. 4B is an enlarged cross-section view of another alternate embodiment of the wedge having a flexible hinge.

An alternate embodiment of the flexible hinge 70, indicated by reference number 72, is illustrated in FIG. 4B. The flexible hinge 72 is similar to the flexible hinge 70 shown in FIG. 4A. However, the flexible hinge 72 shown in FIG. 4B is in contact with the pole shoes 28. The flexible hinge 72 allows independent compression between the pole shoes 28 and the wire coils 36. The wire coils have a looser tolerance and a low stiffness allowing the winding support surface 58 to have more compression against the coil wires 36.

Figure 5A:
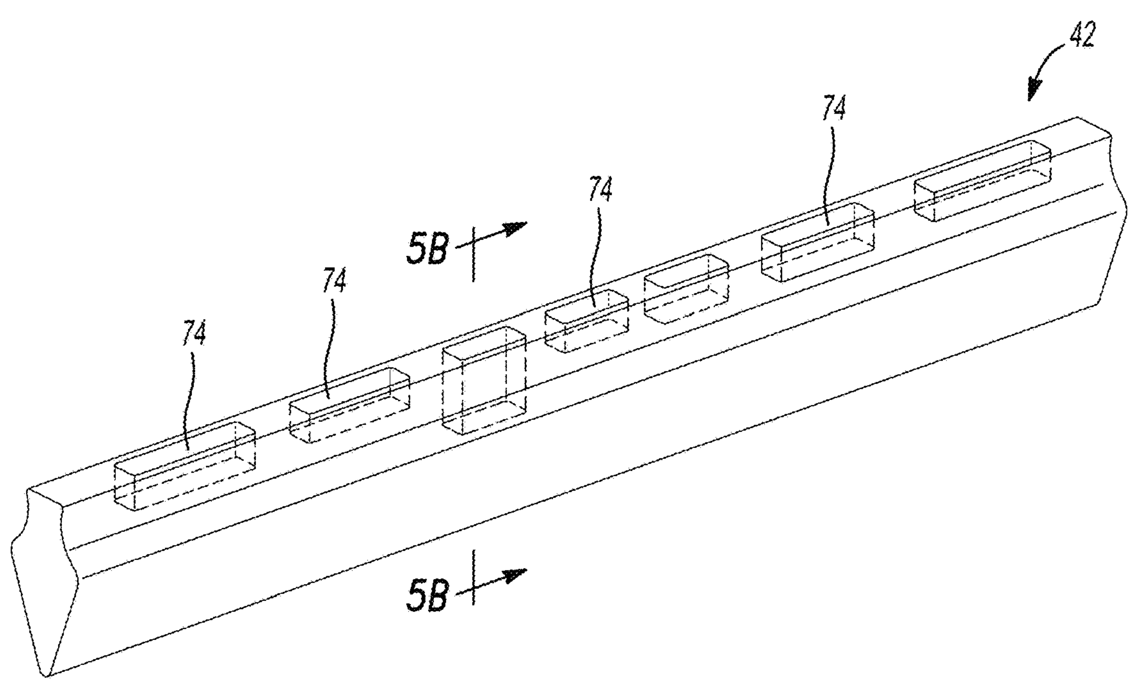
FIG. 5A is an isometric view of an inner wedge.
Figure 5B:
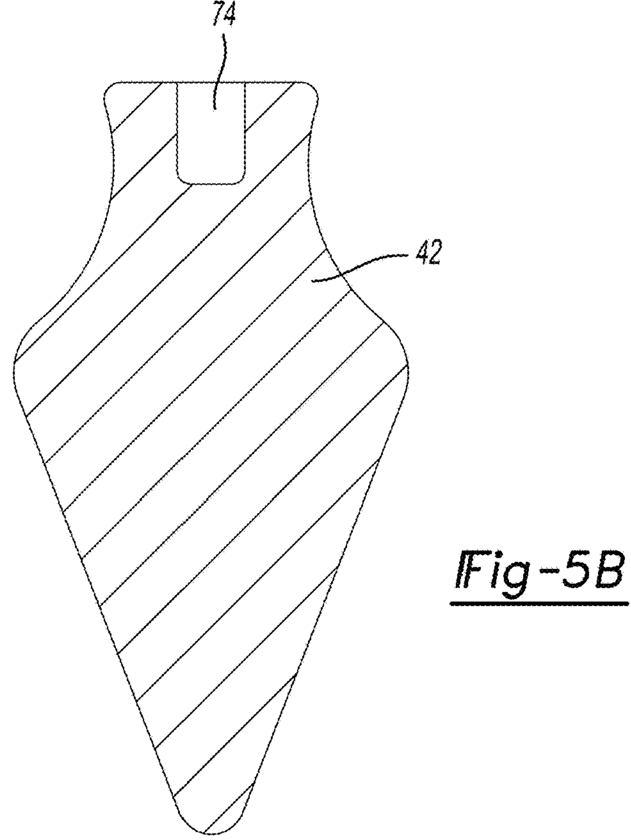
FIG. 5B is a cross-section view of the inner wedge viewed in the direction of arrows 5B-5B in FIG. 5A.

Returning to FIG. 3, the inner wedge 42 is disposed within the groove of the outer wedge 40. The inner wedge 42 matches the contour of the outer wedge 40 and extends along the axial length of the outer wedge 40, creating contact pressure against the outer wedge 40. The inner wedge 42 includes pockets 74 illustrated in FIG. 5A and FIG. 5B. The pockets 74 are disposed on the inner wedge 42, located at the outer diameter of the rotor 12. The pockets 74 vary in length and depth, creating a customized stiffness to the outer wedge 40.

Figures 6A, 6B, 7:
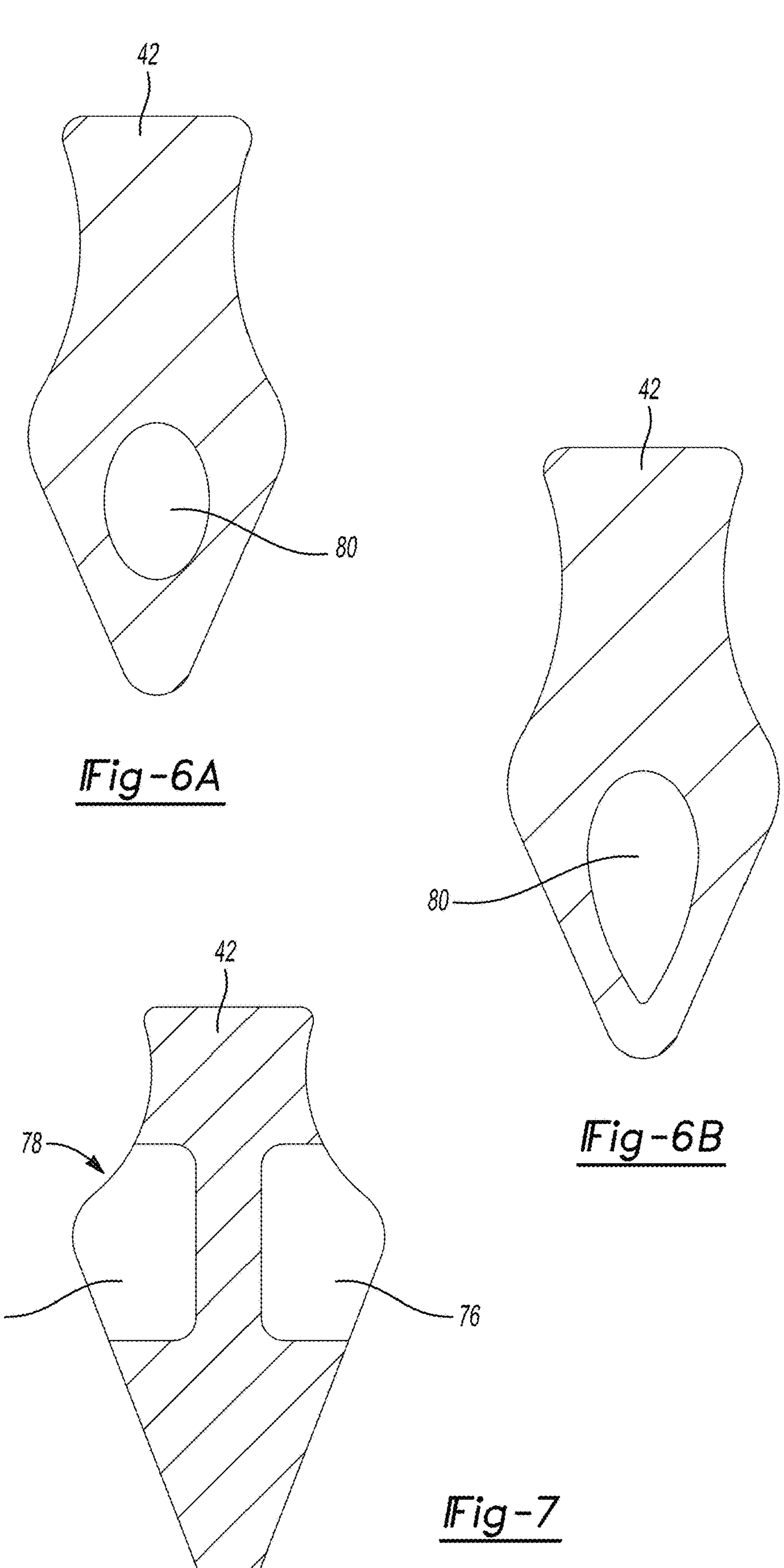
FIG. 6A is an enlarged cross-section view of another alternate embodiment of the wedge having the inner wedge with a shaped hole.
FIG. 6B is an enlarged cross-section view of another alternate embodiment of the wedge having an inner wedge with a shaped hole.
FIG. 7 is a cross-section view of an alternate embodiment of the inner wedge.

In an alternate embodiment, the pockets 74 are replaced by pockets 76, illustrated in FIG. 7. The pockets 76 are similar to the pockets 74 shown in FIGS. 5A and 5B. The pockets 76 create customized stiffness to the outer wedge 40. However, the pockets 76 are disposed on sides 78 of the inner wedge 42 and are in contact with the convex portion 62 (shown in FIG. 3) of the outer wedge 40 (shown in FIGS. 1-3).

In another alternate embodiment, the inner wedge 42 defines a shaped hole 80, illustrated in FIG. 6A and FIG. 6B. The shaped hole 80 may vary in shape and extends along the axial length of the inner wedge 42. The shaped hole 80 aids in absorbing winding tolerance and maintaining the seal between the wedges 10 (shown in FIGS. 2-3) and the pole shoes 28 (shown in FIGS. 2-3). The shaped hole also allows a tunable compression stiffness from the poles 24 to the adjacent poles 24. The shaped hole 80 may be oval (FIG. 6A) or tear-drop shaped (FIG. 6B).

Returning now to FIGS. 1-3, the outer wedge 40 is inserted into the slots 26 through the use of a tool (not shown). Once inserted, the outer wedge 40 compresses against the pole shoes 28 and the wire coils 36. The top portion 44 creates two seals against the pole shoes 28. The upper surface 54 of the top portion 44 creates the first seal, where the first seal is maintained while the rotor 12 is stationary. The lower surface 56 of the top portion 44 creates the second seal, where the second seal is maintained while the rotor 12 undergoes high rotational speeds. The inner wedge 42 is inserted within the outer wedge 40 and further strengthens the first seal and the second seal by applying contact pressure to the outer wedge 40.

The bottom portion 46 compresses and maintains the alignment of the wire coils 36. A wire varnish is inserted to further maintain the alignment of the wire coils 36 and provide protection to the wire coils 36 from strain experienced through the presence of the radial load. The insertion of the wire varnish also seals spaces between the laminates 18 that form the laminate core 14. The wire varnish is inserted through varnish manifolds 64 (shown in FIGS. 2-3). The varnish manifolds 64 are defined by the convex portion 62 of the outer wedge 40, the pole shoes 28, and the wire coils 36.

Advantages of the wedge 10 design include creating two seals with the pole shoes 28, where the second seal is maintained during the presence of high rotational speeds. Additionally, the wedges 10 create strong seals with the pole shoes 28 while covering a small surface area of the slots 26. This enables the use of additional wire coils 36 or the use of thicker wire coils 36.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A wedge for a rotor, the rotor including a laminate core that defines a rotational axis, poles, and pole shoes, wherein the rotor defines slots for receiving wire coils, the wedge comprising:

an outer wedge that defines a wedge central axis perpendicular to the rotational axis, wherein the outer wedge is disposed in the slots, the outer wedge including:

a top portion disposed at an outer diameter of the rotor, the top portion including:

an upper surface that slopes away from the wedge central axis while moving radially outward and perpendicular from a rotor axis, wherein the upper surface compresses against the pole shoe to create a seal; and a lower surface that slopes towards the wedge central axis while moving radially outward and perpendicular from the rotor axis, wherein the lower surface seals to the pole when a radial load is present, wherein the upper surface and the lower surface create a continuous curve; and a bottom portion continuously connected to the top portion, the bottom portion including:

a winding support surface connected to the lower surface of the top portion; and a wedge tip surface, wherein the wedge tip surface extends towards the laminate core along the wedge central axis, wherein the winding support surface and the wedge tip surface are adjacent to the wire coils.

2. The wedge of claim 1, wherein the outer wedge includes a convex portion disposed between the lower surface of the top portion and the winding support surface of the bottom portion.

3. The wedge of claim 2, further comprising varnish manifolds defined by the convex portion and the pole shoes, wherein the varnish manifolds enable a varnish to cover the wire coils and seal spaces between laminates that form the laminate core.

4. The wedge of claim 1, wherein the outer wedge includes a flexible hinge where the lower surface of the top portion and the bottom portion of the outer wedge connect, the flexible hinge allowing the top portion to move independently relative to the bottom portion.

5. The wedge of claim 1, wherein the winding support surface forms a slant away from the wedge central axis while moving radially outward and perpendicular from the rotor axis.

6. The wedge of claim 1, further comprising an inner wedge, the inner wedge disposed within a groove of the outer wedge, wherein the inner wedge matches a contour of an inner surface of the outer wedge and creates compression against the pole shoes and the winding support surface.

7. The wedge of claim 6, wherein the inner wedge defines a shaped hole along an axial length of the wedge, the shaped hole increases an absorption of the radial load and allows a tunable compression stiffness from the poles to adjacent poles.

8. The wedge of claim 6, further comprising pockets on the inner wedge, the pockets each vary in size to adjust stiffness along the axial length of the wedge.

9. The wedge of claim 8, wherein the pockets are on an upper surface of the inner wedge, wherein the upper surface of the inner wedge is disposed at the outer diameter of the rotor.

10. The wedge of claim 8, wherein pockets are on sides of the inner wedge, wherein the sides of the inner wedge are in contact with the inner surface of the outer wedge.

11. A wedge for a rotor, the rotor including a laminate core that defines a rotational axis, poles, and pole shoes, wherein the rotor defines slots for receiving wire coils, the wedge comprising:

an outer wedge that defines a wedge central axis perpendicular to the rotational axis, wherein the outer wedge is disposed in the slots, the outer wedge including:

a top portion disposed at an outer diameter of the rotor, the top portion including:

an upper surface that slopes away from the wedge central axis while moving radially outward and perpendicular from a rotor axis, wherein the upper surface compresses against the pole shoe to create a seal; and a lower surface that slopes towards the wedge central axis while moving radially outward and perpendicular from the rotor axis, wherein the lower surface seals to the pole when a radial load is present, wherein the upper surface and the lower surface create a continuous curve; and a bottom portion continuously connected to the top portion, the bottom portion including:

a winding support surface connected to the lower surface of the top portion; and a wedge tip surface, wherein the wedge tip surface extends towards the laminate core along the wedge central axis, wherein the winding support surface and the wedge tip surface are adjacent to the wire coils; and an inner wedge, disposed within a groove of the outer wedge, wherein the inner wedge creates compression against the pole shoes and the winding support surface.

12. The wedge of claim 11, further comprising varnish manifolds defined by the pole shoes and where the lower surface of the top portion and the bottom portion of the outer wedge connect, wherein the varnish manifolds enable a varnish to cover the wire coils and fill spaces between laminates that form the laminate core.

13. The wedge of claim 11, wherein the outer wedge includes a flexible hinge where the lower surface of the top portion and the bottom portion of the outer wedge connect, the flexible hinge allowing the top portion to move independently relative to the bottom portion.

14. The wedge of claim 11, wherein the winding support surface forms a slant away from the wedge central axis while moving radially outward and perpendicular from the rotor axis.

15. The wedge of claim 11, wherein the inner wedge defines a shaped hole along an axial length of the wedge, the shaped hole increases an absorption of the radial load and allows tunable compression stiffness from the poles to adjacent poles.

16. The wedge of claim 11, wherein the inner wedge matches the contour of an inner surface of the outer wedge.

17. The wedge of claim 11, further comprising pockets on the inner wedge, the pockets each vary in size to adjust stiffness along the axial length of the wedge.

18. The wedge of claim 17, wherein the pockets are on an upper surface of the inner wedge, wherein the upper surface of the inner wedge is disposed at the outer diameter of the rotor.

19. The wedge of claim 17, wherein pockets are on sides of the inner wedge, wherein the sides of the inner wedge are in contact with the inner surface of the outer wedge.

20. A rotor for a separately excited synchronous motor, the rotor comprising:

a laminate core, wherein the laminate core includes poles and pole shoes that define slots;

a copper winding wrapped around the poles;

a wedge, the wedge comprising:

an outer wedge that defines a wedge central axis perpendicular to the rotational axis, wherein the outer wedge is disposed in the slots, the outer wedge including:

a top portion disposed at an outer diameter of the rotor, the top portion including:

an upper surface, wherein the upper surface compresses against the pole shoes to create a first seal; and a lower surface, wherein the lower surface compresses against the pole shoes to create a second seal;

a bottom portion continuously connected to the top portion, the bottom portion including:

a winding support surface connected to the lower surface of the top portion; and a wedge tip surface, wherein the wedge tip surface extends towards the laminate core along the wedge central axis; and an inner wedge, disposed within a groove of the outer wedge, wherein the inner wedge creates compression against the pole shoes and the winding support surface.

* * * * *